US012688834B2

(12) United States Patent
Chung et al.

(10) Patent No.: US 12,688,834 B2
(45) Date of Patent: Jul. 21, 2026

(54) BACKLIGHT CONTROLS

(71) Applicant: Hewlett-Packard Development Company, L.P., Spring, TX (US)

(72) Inventors: Chih-Ping Tom Chung, Taipei City (TW); Yi-Fan Lin, Taipei City (TW); Jung-Fang Jason Wu, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/720,908

(22) PCT Filed: Dec. 17, 2021

(86) PCT No.: PCT/US2021/064143

§ 371 (c)(1),
(2) Date: Jun. 17, 2024

(87) PCT Pub. No.: WO2023/113825

PCT Pub. Date: Jun. 22, 2023

(65) Prior Publication Data

US 2025/0054451 A1 Feb. 13, 2025

(51) Int. Cl.
*G09G 3/34* (2006.01)

(52) U.S. Cl.
CPC ... *G09G 3/3406* (2013.01); *G09G 2310/0243* (2013.01); *G09G 2320/064* (2013.01); *G09G 2360/16* (2013.01); *G09G 2370/045* (2013.01)

(58) Field of Classification Search
CPC . G09G 3/3406; G09G 2360/16; G09G 3/3426
See application file for complete search history.

(56) References Cited

U.S. PATENT DOCUMENTS

| | | | | |
|---|---|---|---|---|
| 6,431,441 | B1 | 8/2002 | Franchi | |
| 7,181,311 | B2 | 2/2007 | Dachs et al. | |
| 8,144,112 | B2 | 3/2012 | Huang | |
| 9,401,114 | B2 | 7/2016 | Lin et al. | |
| 10,930,194 | B2 * | 2/2021 | Lin | G09G 5/18 |
| 2004/0212651 | A1 | 10/2004 | Johnson et al. | |
| 2016/0155389 | A1 * | 6/2016 | Beon | G09G 3/3406 345/690 |
| 2018/0367317 | A1 | 12/2018 | Forler et al. | |
| 2021/0174750 | A1 * | 6/2021 | Yeh | G09G 3/3406 |

(Continued)

FOREIGN PATENT DOCUMENTS

| | | | |
|---|---|---|---|
| WO | 2002/047215 | A1 | 6/2002 |
| WO | 2009/126124 | A1 | 10/2009 |

OTHER PUBLICATIONS

KR20050098686A Backlight Auto Control Device of Mobile Handset and Method of Controlling the Same Oct. 12, 2005 (Year: 2005).*

*Primary Examiner* — Van N Chow
(74) *Attorney, Agent, or Firm* — Quarles & Brady LLP

(57) ABSTRACT

In some examples, a display device includes a panel, a scaler circuit, and a backlight control circuit. In some examples, the scaler circuit receives a panel identification from the panel and determines a backlight module driving configuration based on the panel identification. In some examples, the backlight control circuit receives the backlight module driving configuration from the scaler circuit and controls a backlight for the panel based on the backlight module driving configuration.

18 Claims, 6 Drawing Sheets

(56) References Cited

U.S. PATENT DOCUMENTS

| | | | | |
|---|---|---|---|---|
| 2021/0233478 | A1* | 7/2021 | Sun | G09G 3/36 |
| 2022/0147142 | A1* | 5/2022 | Bui | G09G 3/2092 |
| 2023/0081458 | A1* | 3/2023 | Chen | G09G 3/3406 345/691 |
| 2023/0410758 | A1* | 12/2023 | Chen | G09G 3/342 |
| 2024/0212585 | A1* | 6/2024 | Lee | G09G 3/32 |
| 2024/0330106 | A1* | 10/2024 | Kim | G09G 5/006 |
| 2025/0061864 | A1* | 2/2025 | Dambach | G09G 3/3426 |

* cited by examiner

BACKLIGHT CONTROLS

BACKGROUND

Some electronic devices include electronic circuitry for performing processing. As processing capabilities have expanded, electronic devices have been utilized to perform more functions. For example, a variety of electronic devices are used for work, communication, and entertainment. Electronic devices may be linked to other devices and may communicate with other devices.

DETAILED DESCRIPTION

Figure 1:
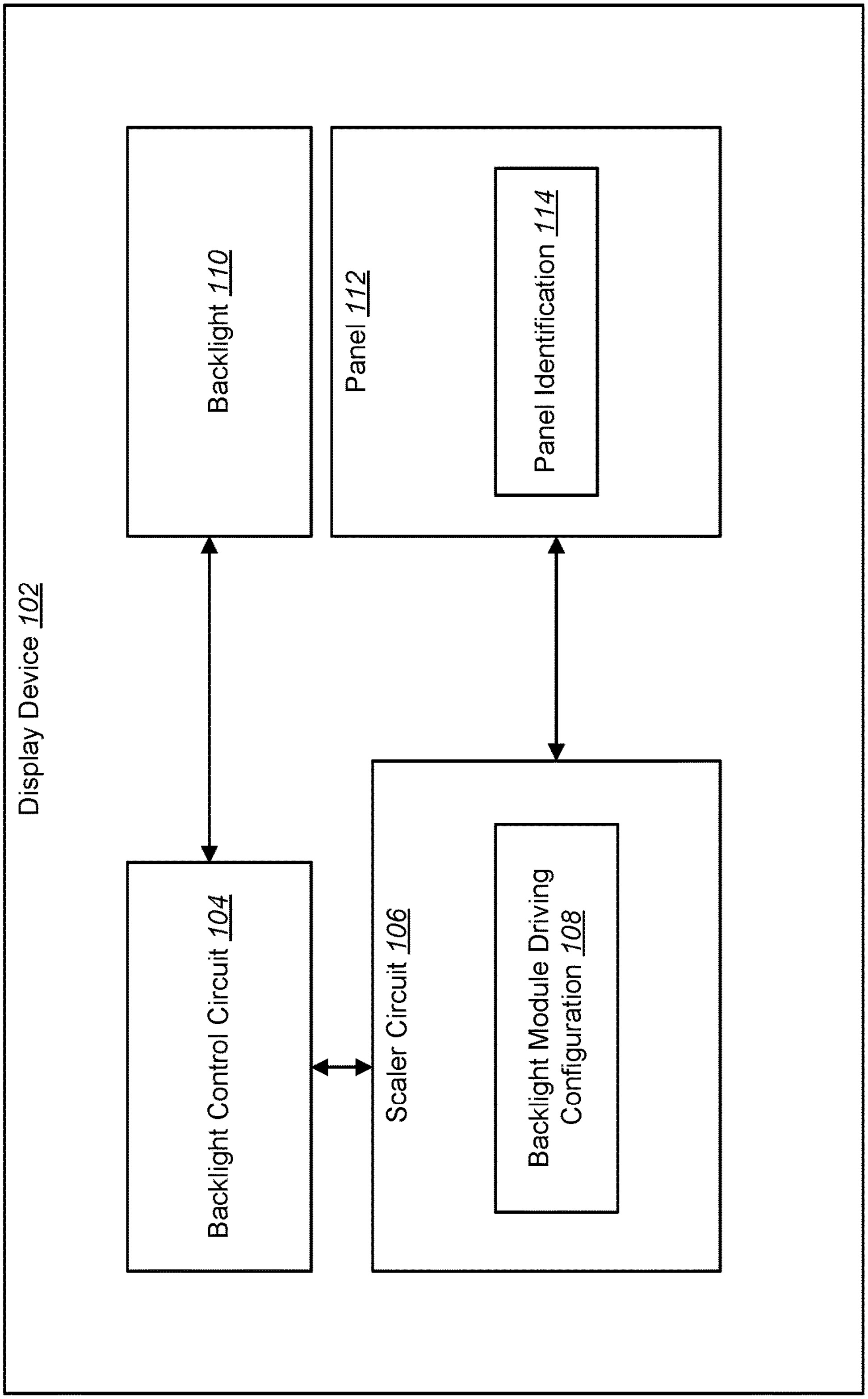
FIG. 1 is a block diagram of an example of a display device that may be used to provide backlight controls.

A display device is an electronic device to display and/or process images (e.g., video). Techniques described herein provide a display device that automatically configures backlight control without requiring a change in the hardware configuration of the display device. The display device includes a panel, a scaler circuit, and a backlight control circuit. The scaler circuit receives a panel identification from the panel and determines a backlight module driving configuration based on the panel identification. The backlight control circuit receives the backlight module driving configuration from the scaler circuit and controls a backlight for the panel based on the backlight module driving configuration. Thus, backlight control may be provided via signals or data provided based on the panel identification without changes to the hardware circuitry.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a block diagram of an example of a display device 102 that may be used to perform backlight controls. The display device 102 includes a panel 112, a backlight 110, a scaler circuit 106, and a backlight control circuit 104. The scaler circuit 106 receives a panel identification 114 from the panel 112 and determines a backlight module driving configuration 108 based on the panel identification 114. The backlight control circuit 104 receives the backlight module driving configuration 108 from the scaler circuit 106 and controls a backlight 110 for the panel 112 based on the backlight module driving configuration 108.

The panel 112 is circuitry to display optical information. Examples of the panel 112 may include a liquid crystal display (LCD) panel, a light emitting diode (LED) panel, microLED panels, and/or miniLED panels, etc. Some display devices may include an LCD cell layer and an LED backlight layer. An image may be produced by emitting light from the LED backlight layer through colors exhibited by the LCD cell layer such that the panel 112 may display video data.

The scaler circuit 106 is circuitry to control the display device 102. In some examples, the scaler circuit 106 may be a microcontroller unit (MCU), application-specific integrated circuit (ASIC), and/or other circuitry. In some examples, the scaler circuit 106 may read and/or execute instructions stored in memory to perform an operation or operations (e.g., methods 300, 400 and/or operation(s) thereof) described herein. For instance, the scaler circuit 106 may include memory and/or may have access to memory on a scaler board (not shown in FIG. 1). The memory is a device (e.g., circuitry) to store information. Examples of the memory may include ROM, EPROM, EEPROM, flash memory, DRAM, SDRAM, MRAM, PCRAM, HDD, SSD, optical drive, etc.

The backlight control circuit 104 is a circuit to control the backlight 110 for the panel 112. The backlight control circuit 104 receives instructions or commands from the scaler circuit 106 to control the backlight 110. The backlight 110 provides illumination for the panel 112. In some examples, to control the backlight 110 is to control parameters or settings of the backlight, such as the various parameters or settings relating to the backlight as described herein. In some examples, the backlight controls are the parameters, settings, mechanisms, or functionality used to control the backlight 110.

Examples of the display device 102 may include a monitor, smart display, television, tablet device, smartphone, touchscreen, computer screen, projector, etc. In some examples, the display device 102 may perform a method or methods and/or an operation or operations described herein. The display device 102 may be connected to or integrated with an electronic device.

An electronic device is a device that includes electronic circuitry (e.g., integrated circuitry, a chip(s), etc.). Examples of electronic devices may include docks, monitors, televisions, display devices, display panels, graphics cards, graphics processing units (GPUs), motherboards, computing devices, smartphones, tablet devices, game consoles, etc. Some examples of electronic devices may utilize circuitry (e.g., controller(s) and/or processor(s), etc.) to perform an operation or operations. In some examples, electronic devices may execute instructions stored in memory to perform the operation(s). Instructions may be code and/or programming that specifies functionality or operation of the circuitry. In some examples, instructions may be stored in memory (e.g., Random-Access Memory (RAM), Read-Only Memory (ROM), Erasable Programmable Read-Only Memory (EPROM), Electrically Erasable Programmable Read-Only Memory (EEPROM), flash memory, dynamic random-access memory (DRAM), synchronous DRAM (SDRAM), magnetoresistive random-access memory (MRAM), phase-change random-access memory (PCRAM), hard disk drive (HDD), solid state drive (SSD), optical drive, etc.). In some examples, different circuitries in an electronic device may store and/or utilize separate instructions for operation.

The display device 102 may also be linked to a source device(s) and/or other display device(s) (not shown in FIG.

1) in some examples. A source device is a device that generates, produces, provides, and/or outputs video data (e.g., image(s), a video stream, video frames, etc.). Examples of a source device may include a computing device, a display device, GPU, audio/video (A/V) receiver, smartphone, laptop computer, media player, game console, television stick, media receiver, media drive, media server, disc player (e.g., digital versatile disc (DVD) player, Blu-ray Disc™ player, etc.), video doorbell, display device, hub, dock, etc.

A source device may be linked to the display device 102 with a link. The link may be a wired or wireless link. In some examples, a wired link (e.g., cable) may include multiple wires and/or pins. The link may provide a channel or channels (e.g., data channel, auxiliary channel, and/or connection detection channel, etc.) for communication. A channel may be a physical channel (e.g., wire) and/or a logical channel (e.g., frequency domain and/or time domain resources, multiplexed channel, etc.). More or fewer channels, links, and/or cables may be used in some examples.

In some examples, a source device may include transmission circuitry and/or reception circuitry. The link may be provided by and/or connected to the transmission circuitry and/or reception circuitry of a source device.

In some examples, the scaler circuit 106 and/or a scaler board may include an interface (not shown in FIG. 1). The interface is circuitry to communicate with an electronic device(s) (e.g., source device, and/or another display device, etc.). The interface may be a wired and/or wireless communication interface (e.g., WI-FI® communication interface, Bluetooth® communication interface, cellular communication interface, etc.). In some examples, the interface may include a port or ports and corresponding circuitry to support a link or links. For instance, some ports may be utilized to link to a device (e.g., the source device, and/or another display device, etc.) that may be external to the display device 102. Examples of ports with supporting circuitry may include a Universal Serial Bus (USB) interface (e.g., USB Type-C® (USB-C®), USB Type-A, USB Type-B, USB 2.0, USB 2.0, USB Mini-B, USB Micro-B, etc.), Lightning® interface, Ethernet interface, DisplayPort™ interface, HDMI® interface, etc. In some examples, the interface may include a port, transceiver circuitry, and/or an interface controller. For instance, the interface may enable receiving video data for display on the display device 102. In some examples, the interface may receive video data from a source device.

Figure 2:
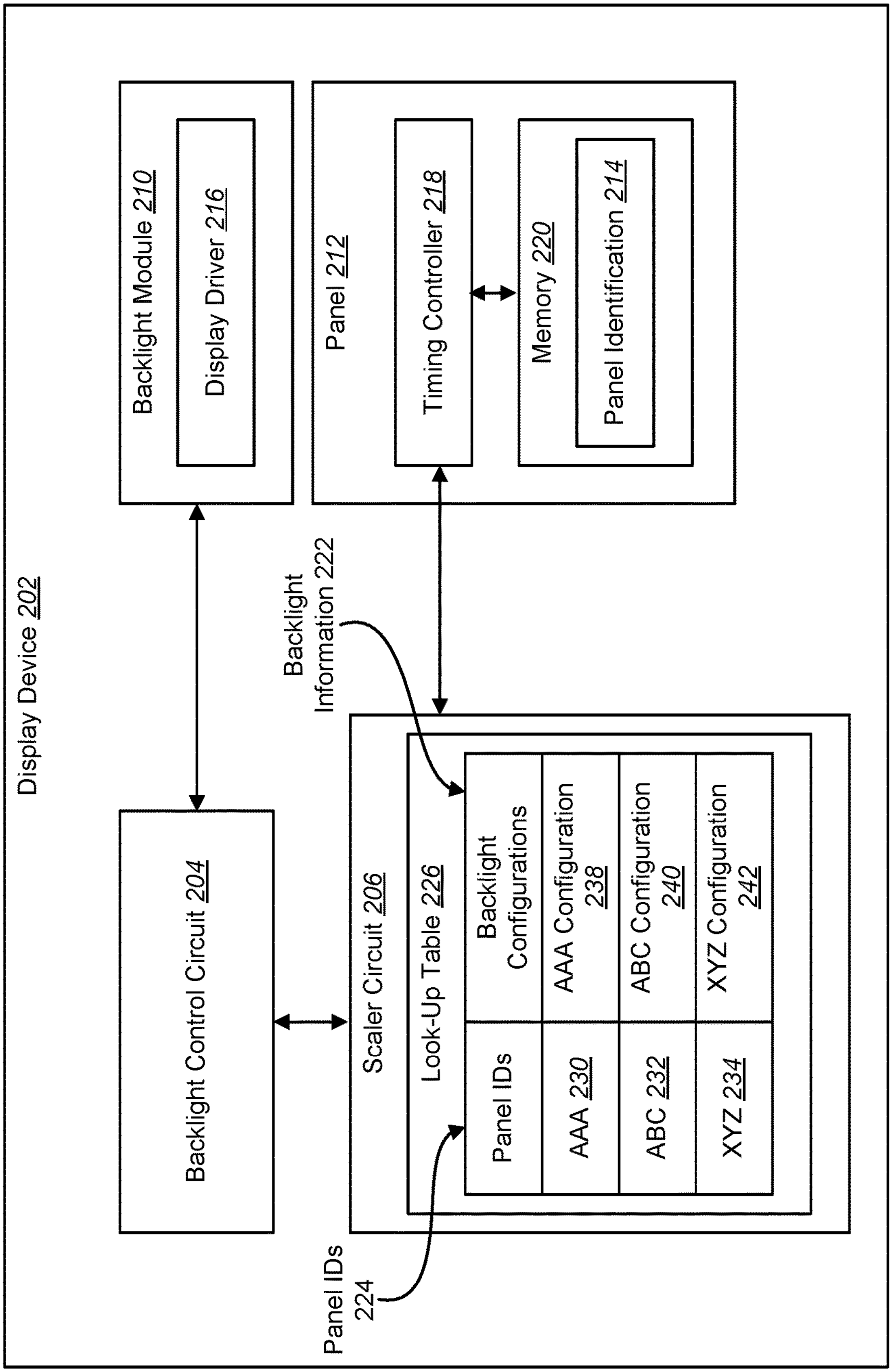
FIG. 2 is a block diagram of an example of a display device that may be used to provide backlight controls.

FIG. 2 is a block diagram of an example of a display device 202 that may be used to perform backlight controls. The display device 202 includes a panel 212, a backlight module 210, a scaler circuit 206, and a backlight control circuit 204. The display device 202 may be an example of display device 102 described in relation to FIG. 1. The components described in relation to FIG. 2 may be examples of corresponding components described in relation to FIG. 1.

In some examples, the scaler circuit 206 receives the panel identification 214 from the panel 212 and determines a backlight module driving configuration based on the panel identification 214. The scaler circuit 206 provides the backlight module driving configuration to the backlight control circuit 204 to control the backlight for the panel 212. In some examples, the backlight control circuit 204 is a backlight control integrated circuit (IC).

The display device 202 may include a timing controller 218. A timing controller 218 is a circuit that maps image data (e.g., frame data) to display locations (e.g., cells, pixels, rows, columns, panel addresses, etc.). A timing controller 218 may receive image data from another circuit (e.g., graphics processing unit (GPU), memory, etc.). In some examples, the timing controller 218 may be a microcontroller unit (MCU), application-specific integrated circuit (ASIC), and/or other circuitry.

In some approaches, a timing controller 218 may be utilized to support displaying an image (e.g., startup image, logo, etc.) from memory included in a display device and/or on a timing controller board. For instance, image data representing an image may be stored in memory on the display device 202 and may be displayed when display device backlight control signals are ready. The memory capacity on the display device 202 may be relatively small, which may limit the quantity and/or quality (e.g., resolution, color depth, etc.) of an image(s) stored in the memory 220 on the display device 202.

The display device 202 may also include memory 220 to store the panel identification 214. The timing controller 218 is in electronic communication with the memory 220 to read the memory 220 to obtain the panel identification 214 and provide the panel identification 214 to the scaler circuit 206. In some examples, the memory 220 may be an Electrically Erasable Programmable Read-Only Memory (EEPROM) in electronic communication with the timing controller 218 via an Inter-Integrated Circuit (I2C or I2C BUS®) interface.

The panel identification 214 is an identifier that identifies the specific panel 212. In some examples, the panel identification 214 may be display identification (DisplayID) and/or extended display identification data (EDID). The panel identification 214 indicates a characteristic or characteristics of a display. For instance, DisplayID and/or EDID may include data indicating a manufacturer identifier (e.g., name), serial number, display size, supported timing(s), resolution(s) device type, and/or another characteristic or characteristics, etc. The scaler circuit 206 sets the backlight configuration based on the panel identification 214. The backlight configuration is one example of a backlight module driving configuration 108.

The scaler circuit 206 is in electronic communication with the timing controller 218. In some examples, the scaler circuit 206 may be coupled to the timing controller 218 via an I2C BUS® interface. Low-Voltage Differential Signaling (LVDS) may be used. The scaler circuit 206 may also be coupled to the timing controller 218 using an Embedded DisplayPort™ (eDP) interface. eDP has an auxiliary channel (AUX) that may be used to communicate the panel identification 214.

The scaler circuit 206 is in electronic communication with the backlight control circuit 204. In some examples, the scaler circuit 206 may be coupled to the backlight control circuit 204 via an I2C BUS® interface.

In some examples, the scaler circuit 206 stores a look-up table 226 of a plurality of backlight settings for different panels. The scaler circuit 206 accesses the look-up table 226 to determine the backlight settings to be sent to the backlight control circuit 204. The look-up table 226 includes a plurality of panel identifications 224 with corresponding backlight information 222 for each panel identified. For example, a panel identification (panel ID) of AAA 230 has a corresponding backlight configuration listed as AAA configuration 238 in FIG. 2. In some examples, a panel ID is an integer or alphanumeric data that identifies a panel. Other data types may be used as a panel ID. A panel ID of ABC 232 has a corresponding backlight configuration shown as ABC configuration 240. A panel ID of XYZ 234 has a corresponding backlight configuration of XYZ configuration 242. The backlight configuration look-up table 226 may have more entries than shown in FIG. 2.

In some examples, the backlight information 222 may include backlight configurations for LED current and accuracy, LED dimming type, LED PWM duty linearity, and a protection mechanism.

The LED current and accuracy may define the LED forwarding current and brightness and each channel accuracy. This configuration information controls the current source accuracy of the LED driver (e.g., 1 milliamp (mA), 2 mA, 3 mA, etc., per LED light bar stream).

The LED dimming type may define the LED driver IC 660 dimming type (e.g., brightness-adjusted protocol). For example, the LED dimming type may be analog dimming, pulse width modulation (PWM) dimming or mixed mode (e.g., PWM=80% duty, the brightness is 80% luminance).

The LED PWM duty linearity may provide linearity control. The LED PWM duty linearity setting may include a PWM duty vs. LED current linearity control setting.

The protection mechanism may provide a setting for protection mechanism control. For example, the protection mechanism setting may include short protection (detect a forward voltage), open protection (detect a forward current), or detecting the output voltage.

In some examples, the scaler circuit 206 communicates with the timing controller 218 via an I2C interface to define the LED driver IC 660 and LED Backlight module's 610 current, current accuracy, dimming type, PWM linearity or LED protecting mechanism, etc., configurations. In one example where four bytes are used to store the backlight configuration information 222, a first byte may indicate the LED current setting from 1-3 mA, a second byte may indicate the LED dimming type for PWM mode or Analog mode, a third byte may indicate LED linearity, and a fourth byte may indicate an LED driver protection mechanism.

The scaler circuit 206 searches the list of backlight configurations using the panel identification 214 and selects a specific backlight configuration from the list of backlight configurations based on the matching panel ID 224. The scaler circuit 206 then sends the selected backlight configuration to the backlight control circuit 204. The backlight control circuit 204 then supplies the appropriate power to the backlight module 210. In some examples, the scaler circuit 206 may cause a backlight of the panel 212 to change by sending the selected backlight configuration.

The backlight module 210 provides the backlight for the panel 212. The backlight module 210 is in electronic communication with the backlight control circuit 204 and is controlled by the backlight control circuit 204. The backlight module 210 includes a display driver 216 that drives the illumination of the backlight. The backlight control circuit 204 controls the backlight for the panel 212 by driving the backlight module 210.

The techniques described herein may not need to use a resistor network to configure outputs of a backlight controller. Thus, hardware complexity may be reduced.

Figure 3:
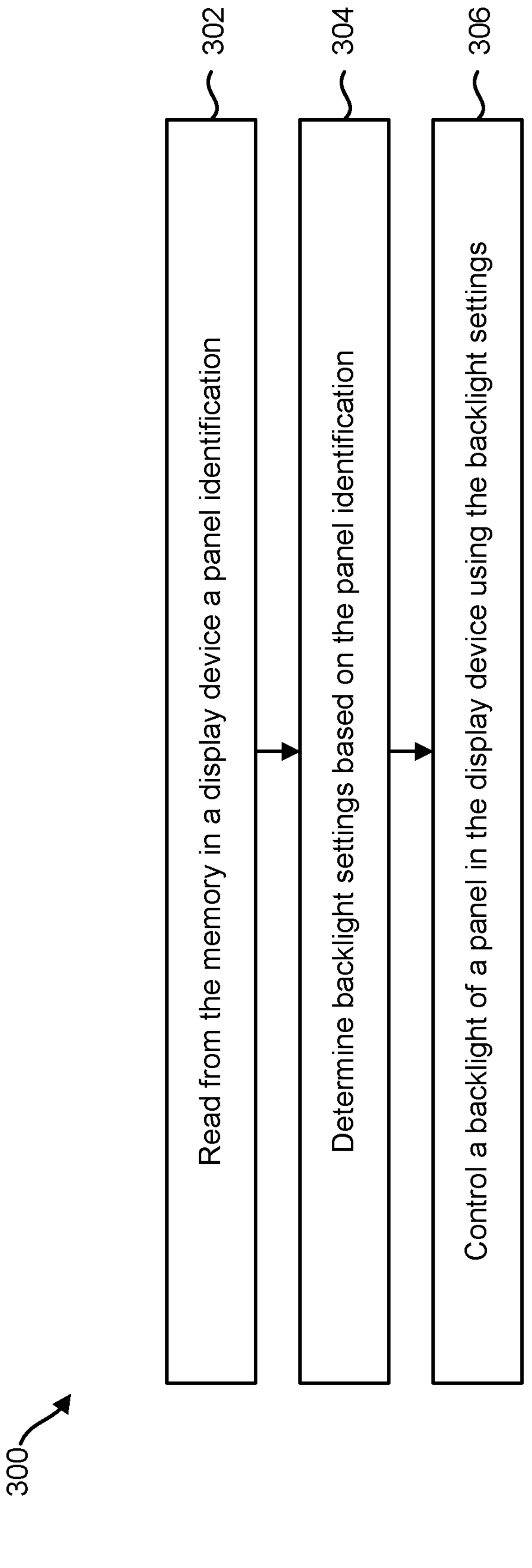
FIG. 3 is a flow diagram illustrating an example of a method for providing backlight controls.

FIG. 3 is a flow diagram illustrating an example of a method 300 for backlight controls. The method 300 and/or a method 300 element(s) may be performed by a display device. For instance, the method 300 may be performed by the display device 102, 202 described in relation to FIG. 1 or FIG. 2.

At 302, the method includes reading from memory in a display device a panel identification. At 304, the method includes determining backlight settings based on the panel identification. In some examples, the method may access a list of backlight configurations where each backlight configuration is identified by panel ID to determine the backlight settings. At 306, the method includes controlling a backlight of a panel in the display device using the backlight settings.

Figure 4:
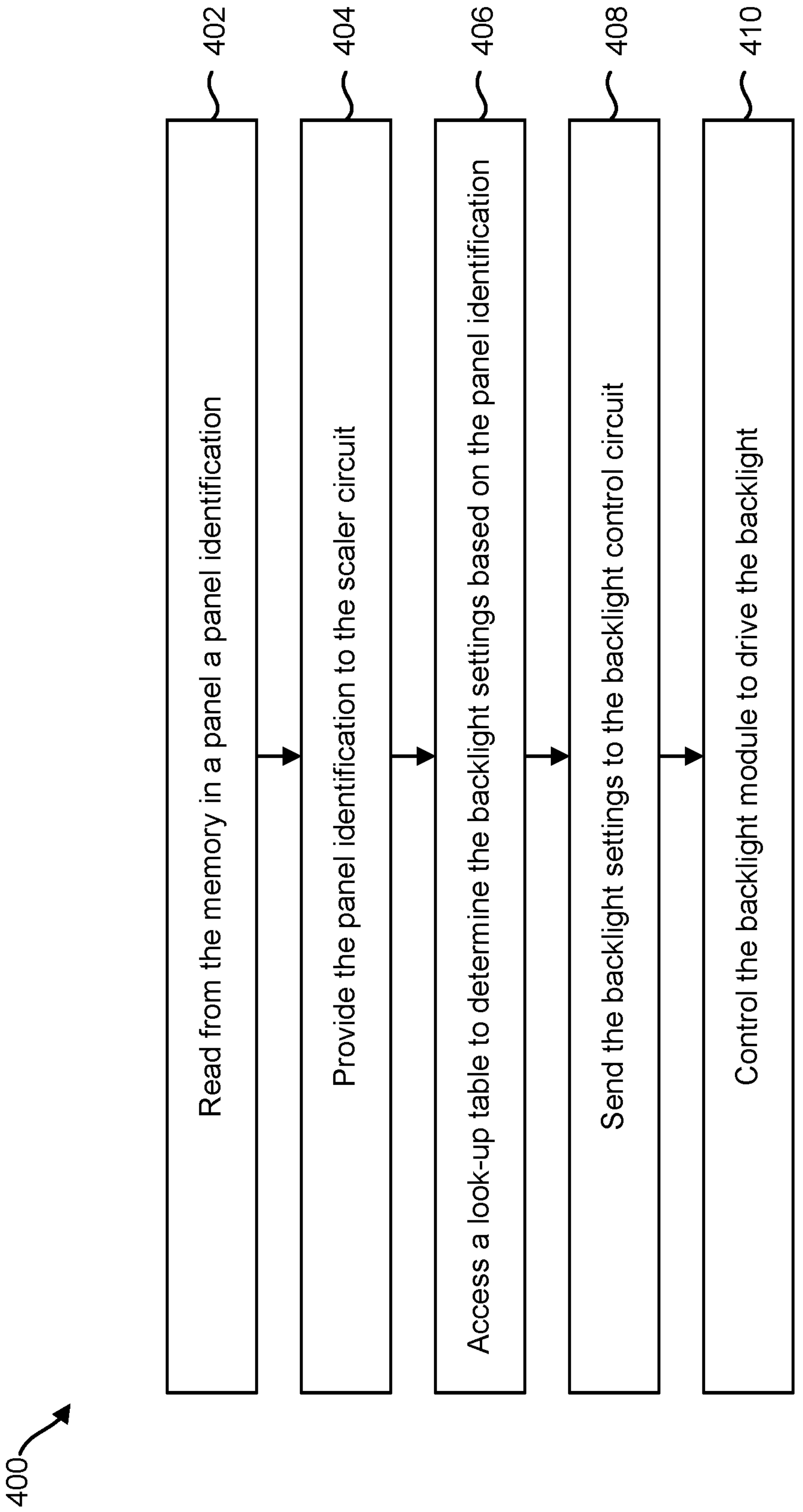
FIG. 4 is a flow diagram illustrating an example of a method for providing backlight controls.

FIG. 4 is a flow diagram illustrating an example of a method 400 for backlight controls. The method 400 and/or a method 400 element(s) may be performed by a display device. For instance, the method 400 may be performed by the display device 102, 202 described in relation to FIG. 1 or FIG. 2.

At 402, the timing controller reads from memory in a panel a panel identification. In some examples, the manufacturer of the panel may store the panel identification in the memory. At 404, the timing controller provides the panel identification to the scaler circuit. At 406, the scaler circuit accesses a look-up table to determine the backlight settings based on the panel identification. The look-up table may include a plurality of panel identifications with corresponding backlight information. At 408, the scaler circuit sends the backlight settings to the backlight control circuit. At 410, the backlight control circuit controls the backlight module to drive the backlight.

Figure 5:
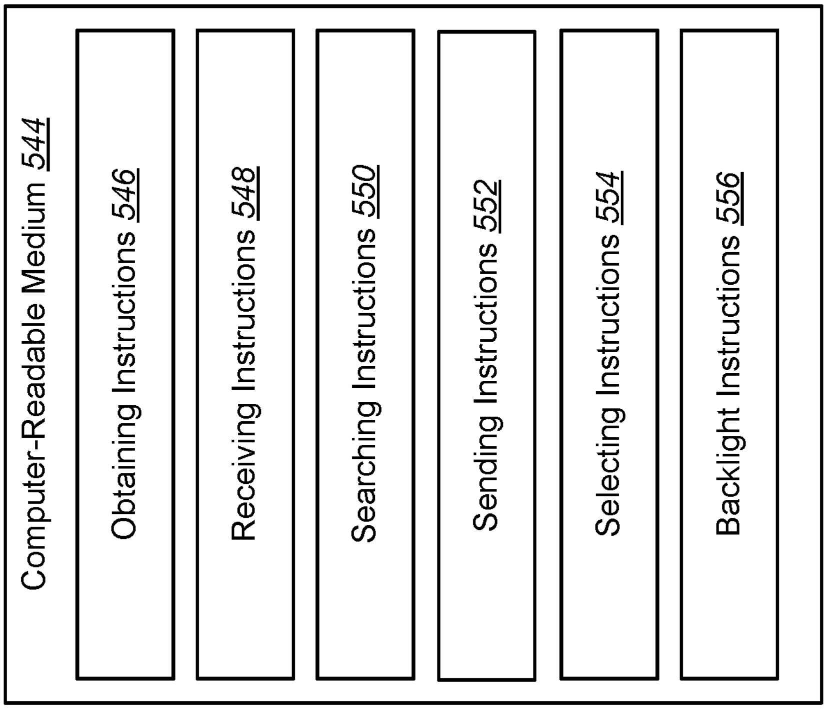
FIG. 5 is a block diagram illustrating an example of a computer-readable medium for providing backlight controls.

FIG. 5 is a block diagram illustrating an example of a computer-readable medium 544 for backlight controls. The computer-readable medium 544 may be a non-transitory, tangible computer-readable medium. The computer-readable medium 544 may be, for example, RAM, EEPROM, a storage device, an optical disc, and/or the like. In some examples, the computer-readable medium 544 may be volatile and/or non-volatile memory, such as DRAM, EEPROM, MRAM, PCRAM, memristor, flash memory, and/or the like. In some examples, the computer-readable medium 544 may be included in a display device and/or may be accessible to a processor of a display device. In some examples, the computer-readable medium 544 may be an example of the memory(ies) described in relation to FIG. 1 and/or FIG. 2.

The computer-readable medium 544 may include data (e.g., information and/or executable instructions, etc.). For example, the computer-readable medium 544 may include obtaining instructions 546, receiving instructions 548, searching instructions 550, and/or sending instructions 552.

In some examples, the obtaining instructions 546 are instructions that cause, when executed, a processor to cause a panel identification to be obtained. The receiving instructions 548 are instructions that cause, when executed, a processor to receive the panel identification from a panel. The searching instructions 550 are instructions that cause, when executed, a processor to search a list of backlight configurations using the panel identification. The sending instructions 552 are instructions that cause, when executed, a processor to send a selected backlight configuration to a backlight control circuit.

The computer-readable medium 544 may also include selecting instructions 554 that cause, when executed, a processor to select the selected backlight configuration from the list of backlight configurations based on the panel identification. The computer-readable medium 544 may also include backlight instructions 556 that cause, when executed, a processor to cause a backlight of the panel to change by sending the selected backlight configuration.

Figure 6:
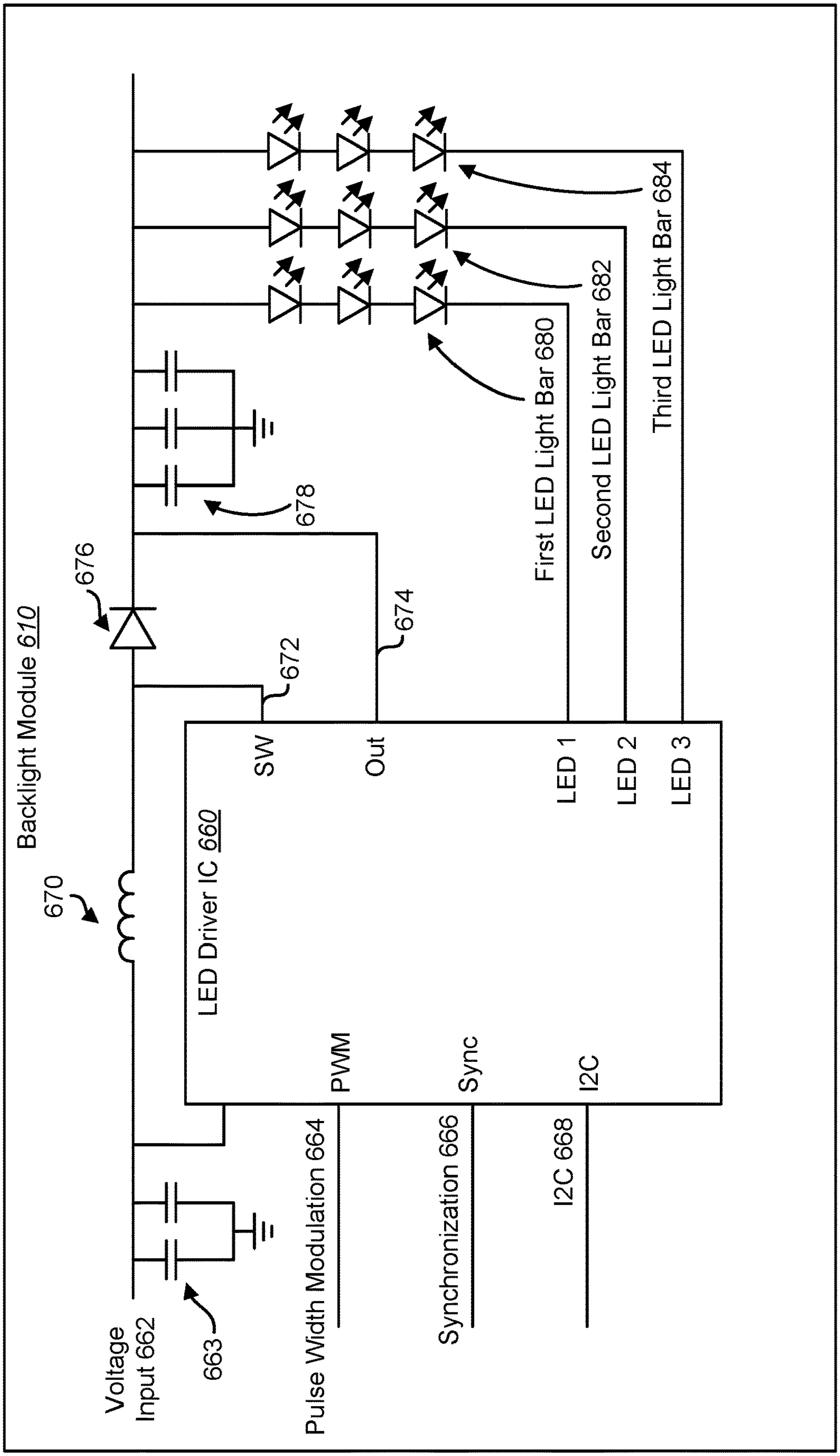
FIG. 6 is a block diagram of an example of a backlight module that may be used to provide backlight controls.

FIG. 6 is a block diagram of an example of a backlight module 610 that may be used to provide backlight controls. The backlight module 610 includes an LED driver IC 660 connected to LED light bars 680, 682, 684. The backlight module 610 may be an example of the backlight module 210 described in relation to FIG. 2. The components described in relation to FIG. 6 may be examples of corresponding components described in relation to FIG. 2.

The LED driver IC 610 may be connected to a voltage input 662. Input capacitors 663 may be connected between the voltage input 662 and ground. A pulse width modulation (PWM) signal 664 is connected to the LED driver IC 660. A synchronization signal 666 is connected to the LED driver IC 660. An I2C interface 668 may be connected to the LED driver IC 660 for communication between front-end devices and the LED light bars 680, 682, 684 to control the LED light bar module current, dimming type, PWM duty, protection mechanism, etc.

An inductor 670 may be connected between the voltage input 662 and the switch pin (SW) 672. The voltage output 674 of the LED driver IC 660 may be connected to the light bars: the first LED light bar 680, the second LED light bar 682, and the third LED light bar 684. Output capacitors 678 may be connected between the output 674 and ground.

A technique or techniques, a method or methods (e.g., method 300 or 400) and/or an operation or operations described herein may be performed by (and/or on) a display device. For instance, a technique or techniques described herein may be performed on a monitor, television, computer with an integrated display panel, etc. In some examples, a source device may include circuitry (e.g., a processor with instructions and/or connection interface circuitry) to perform a technique or techniques described herein.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, aspects or elements of the examples described herein may be omitted or combined.

The invention claimed is:

1. A display device, comprising:
- a panel;
- a scaler circuit to receive a panel identification from the panel and to determine a backlight module driving configuration from a list of panel identifications with corresponding backlight information based on the panel identification; and
- a backlight control circuit to receive the backlight module driving configuration from the scaler circuit and to automatically control a backlight for the panel based on the backlight module driving configuration.

2. The display device of claim 1, further comprising a timing controller and memory, wherein the timing controller is in electronic communication with the memory.

3. The display device of claim 2, wherein the timing controller is to read the panel identification from the memory and to provide the panel identification to the scaler circuit.

4. The display device of claim 2, wherein the memory comprises an electrically erasable programmable read-only memory (EEPROM).

5. The display device of claim 1, further comprising a backlight module in electronic communication with the backlight control circuit.

6. The display device of claim 5, wherein the backlight control circuit controls the backlight for the panel by driving the backlight module.

7. The display device of claim 1, wherein the scaler circuit is in electronic communication with the backlight control circuit via an inter-integrated circuit (I2C) interface.

8. A method, comprising:
- reading from memory in a display device a panel identification;
- accessing a look-up table to determine the backlight settings, wherein the look-up table comprises a plurality of panel identifications with corresponding backlight information;
- determining, by a scaler circuit of the display device, backlight settings based on the panel identification; and
- controlling a backlight of a panel in the display device using the backlight settings independent of user intervention.

9. The method of claim 8, further comprising sending the backlight settings from the scaler circuit to a backlight control circuit.

10. The method of claim 8, wherein controlling the backlight of the panel comprises driving a backlight module of the panel.

11. A non-transitory tangible computer-readable medium comprising instructions when executed cause a processor to:
- cause a panel identification to be obtained;
- receive the panel identification from a panel by a scaler circuit of the panel;
- search, by the scaler circuit, a list of backlight configurations using the panel identification, wherein the list comprises a plurality of panel identifications with corresponding backlight information; and
- send a selected backlight configuration from the scaler circuit to a backlight control circuit.

12. The non-transitory tangible computer-readable medium of claim 11, wherein the processor is to select the selected backlight configuration from the list of backlight configurations based on the panel identification.

13. The non-transitory tangible computer-readable medium of claim 11, wherein the processor is to cause a backlight of the panel to change by sending the selected backlight configuration.

14. The display device of claim 1, wherein the panel identification includes data indicating at least one of a manufacturer identifier, a serial number, a display size, a supported timing, or a resolution device type.

15. The display device of claim 1, wherein the scaler circuit is configured to receive the panel identification from the panel via an auxiliary channel of a display interface between the scaler circuit and the panel.

16. The method of claim 8, wherein the backlight settings include backlight configurations for at least one of a light emitting diode (LED) current, an LED dimming type, an LED pulse-width modulation (PWM) duty linearity, or a protection mechanism.

17. The non-transitory computer-readable medium of claim 11, wherein the panel identification includes data indicating at least one of a manufacturer identifier, a serial number, a display size, a supported timing, or a resolution device type.

18. The non-transitory computer-readable medium of claim 11, wherein the list of backlight configurations is stored in the form of a look-up table indicating a correspondence between a plurality of panel identifications and corresponding backlight information.

* * * * *